US011945131B2

(12) United States Patent
Lupi

(10) Patent No.: US 11,945,131 B2
(45) Date of Patent: Apr. 2, 2024

(54) DEVICE FOR CLAMPING A ROLL OF PAPER IN A CUTTING MACHINE

(71) Applicant: UNICO ENGINEERING S.R.L., Leghorn (IT)

(72) Inventor: Lorenzo Lupi, Highcliffe (GB)

(73) Assignee: UNITED CONVERTING TISSUE S.R.L., Leghorn (IT)

( * ) Notice: Subject to any disclaimer, the term of this patent is extended or adjusted under 35 U.S.C. 154(b) by 154 days.

(21) Appl. No.: 17/731,429

(22) Filed: Apr. 28, 2022

(65) Prior Publication Data

US 2022/0347880 A1 Nov. 3, 2022

(30) Foreign Application Priority Data

Apr. 30, 2021 (IT) ........................ 102021000011042

(51) Int. Cl.
*B26D 3/16* (2006.01)
*B26D 7/02* (2006.01)

(52) U.S. Cl.
CPC ................. *B26D 3/16* (2013.01); *B26D 7/02* (2013.01)

(58) Field of Classification Search
CPC ............. B26D 3/161; B26D 7/02; B26D 3/16
See application file for complete search history.

(56) References Cited

U.S. PATENT DOCUMENTS 5,357,833 A * 10/1994 Biagiotti .................. B26D 7/02 83/458
2009/0314147 A1* 12/2009 Catelli ..................... B26D 7/02 83/788
2012/0204691 A1* 8/2012 Gambini .................. B26D 7/02 83/84
2013/0139664 A1* 6/2013 Diehr ....................... B26D 3/16 83/37
2017/0361484 A1* 12/2017 Pardini .................... B26D 3/16
2018/0162006 A1* 6/2018 Kettula .................. B23D 47/04
2021/0086385 A1* 3/2021 Chiocchetti .......... B26D 7/2621
2022/0347880 A1* 11/2022 Lupi ........................ B26D 7/02
2023/0001494 A1* 1/2023 Apolinari ................. B26D 3/16

FOREIGN PATENT DOCUMENTS

EP 1970175 A1 9/2008

* cited by examiner

*Primary Examiner* — Sean M Michalski
(74) *Attorney, Agent, or Firm* — McGlew and Tuttle, P.C.

(57) ABSTRACT

Device for locking two adjacent sections (1, 2) of a roll of paper (3) placed on the sides of a cutting section plane (4) defined by the movement of a cutting blade (5) of a cutting-off machine (M), comprising a pair of clamping devices (6, 7) configured to be able to assume an unlocking configuration with a locking configuration of respective sections (1, 2) of the roll (3); at least a first actuator (8) which can be operated on command to pass said clamping devices from the unlocking configuration to the locking configuration of the respective sections (1, 2), and vice versa; at least a second actuator (10) connected to the clamping devices (6, 7) and configured to perform a movement of reciprocal distancing of the clamping devices in a locking configuration with respect to said cutting section plane (4); means of inhibition (11) of the reciprocal moving away of the clamping devices active during the cutting advancement of the blade (5) through the roll (3); and activation means (12) of the second actuator (10) of the clamping devices (6, 7) configured to activate the reciprocal removal of the clamping devices immediately after the end of the roll cutting phase (3) performed by the blade (5).

10 Claims, 5 Drawing Sheets

DEVICE FOR CLAMPING A ROLL OF PAPER IN A CUTTING MACHINE

SECTOR OF THE INVENTION

Figure 1:
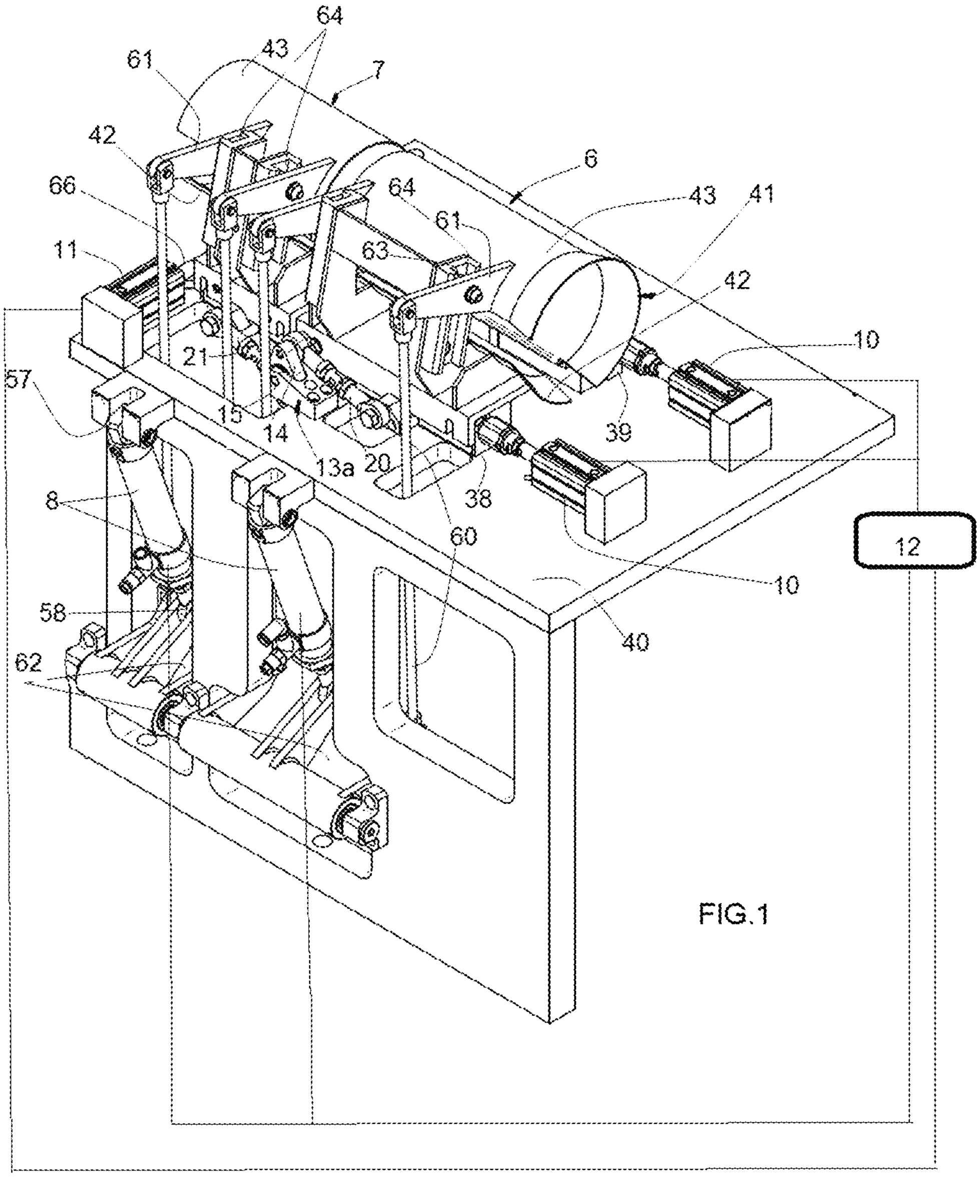

The invention relates to a device for locking in position a roll of paper during the cutting operation, i.e. of reducing a roll of tissue paper of greater length, called log, into rolls of shorter length.

STATE OF THE ART

For the same purpose, devices for cutting machines have been known for some time which block the log while an orbital blade cuts roll sections intended to form rolls of the desired length.

These devices are provided with two locking members, called clamping devices, which tighten the two parts of the log at the sides of a cutting area where the blade of the cutting machine passes, which carries out the cut by advancing through the layers of the wound paper that forms the roll.

Some known devices only have a blocking and unlocking movement of the roll and are controlled in such a way as to keep the roll sections still during cutting and release them after completion to allow the roll to advance along the feed channel of the saw blade and to start the subsequent cutting cycles.

From EP1970175 a locking device is known in which, instead of locking the sections of the roll being formed, during the advancement phase of the blade through the log, the two clamping devices are moved away from each other, drawing the respective log portion, in such a way the blade forms a cut that progressively opens as it proceeds, to the purpose of causing the minimum friction of the paper with the blade.

However, the already known devices have some drawbacks in relation to the accuracy of the cut obtained, which can get worse due to the movement of the two sections of the log and to the high heat that is generated during the cut and absorbed by the blade, which can be estimated at approximately 50% absorbed during cutting and 50% due to the contact of the paper with the blade after the cut, before the removal of the log portion cut to size.

The mere contact of the blade with the paper immediately after the end of the cut determines in fact an overheating of the blade with deformations and other negative effects, which are felt in particular for intensive use of the saw blade with high frequency of the cutting cycles.

AIM OF THE INVENTION

With the present invention it is intended to overcome the drawbacks of the already known solutions and to propose an improved clamping device with respect to devices of the known type, which is capable of contributing to a precise cutting of the log, minimizing the negative effects of the transmission to the blade of the heat generated during the cut.

A further aim is to propose a clamping device of simple and reliable construction, usable with new or pre-existing cutting machines.

SUMMARY OF THE INVENTION

These aims have been achieved by realizing a clamping device for cutting machines according to the attached claims, in which the clamping devices are locked during their cutting and they are opened, and therefore the two sections of the log, once the cut has just taken place so as to timely interrupt the heat exchange between paper and blade.

A first advantage of the invention consists in the high cutting precision which is achieved by the reduction of heat transmitted towards the blade.

A second advantage consists in the high reliability of the device.

A further advantage is the reduction of energy consumption.

An even further advantage consists in the lower contamination of the paper log on the cut section thanks to the use of a lower quantity of lubricant.

A still further advantage consists in the reduced need for blade cooling and in the lengthening of the useful life of the blade, estimated at an increase of 10-15%.

LIST OF DRAWINGS

Figure 1A:
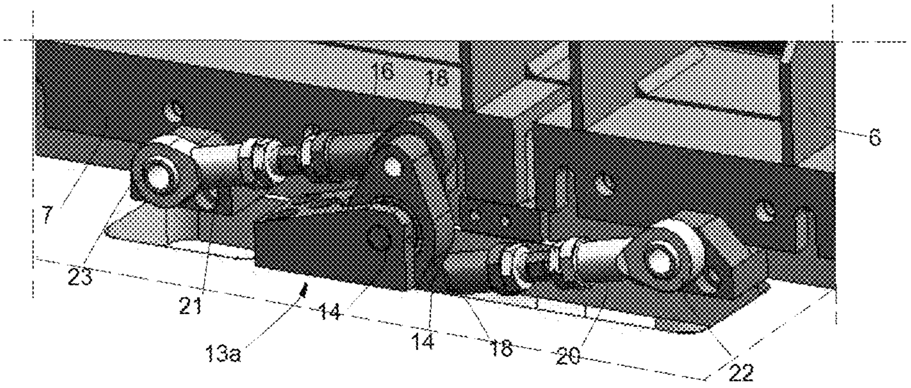
Figure 2A:
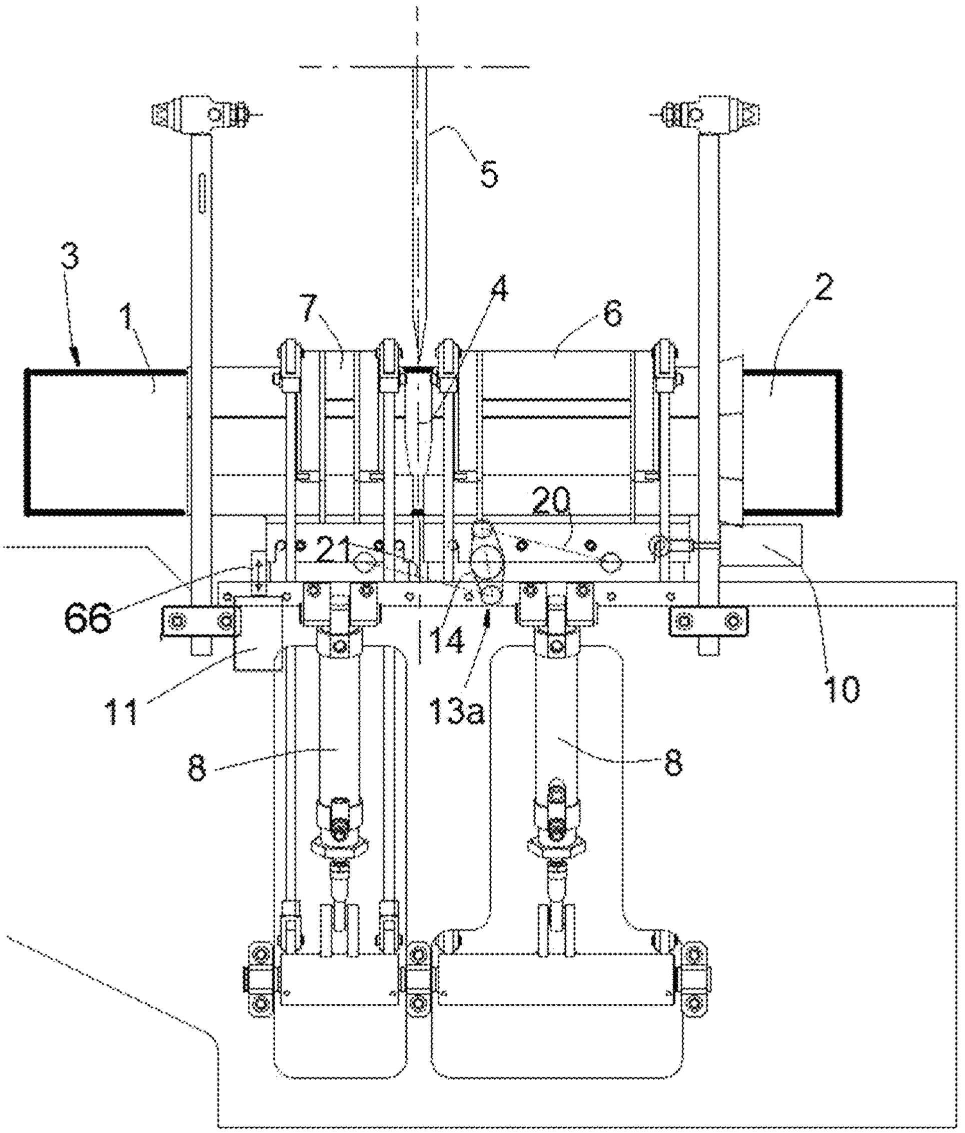
Figure 2B:
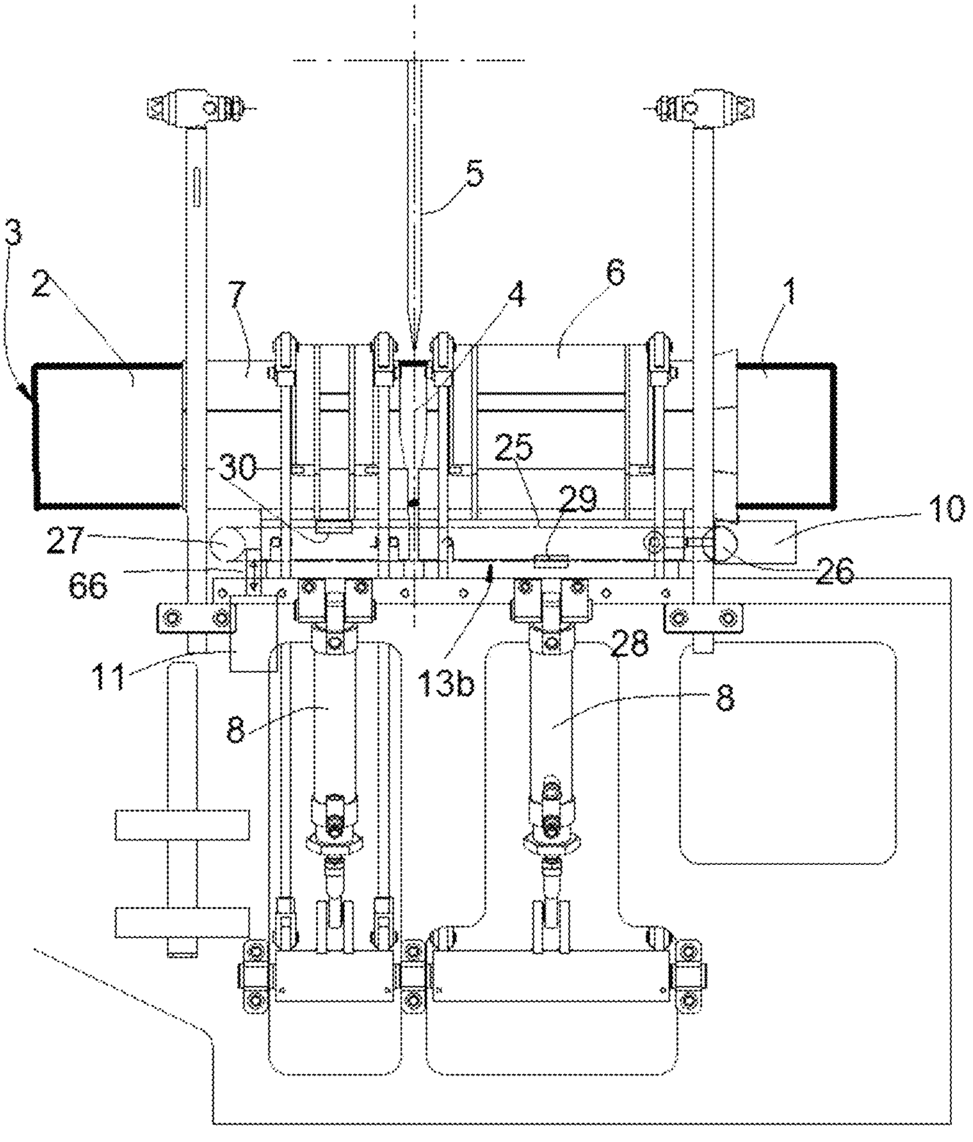
Figure 2C:
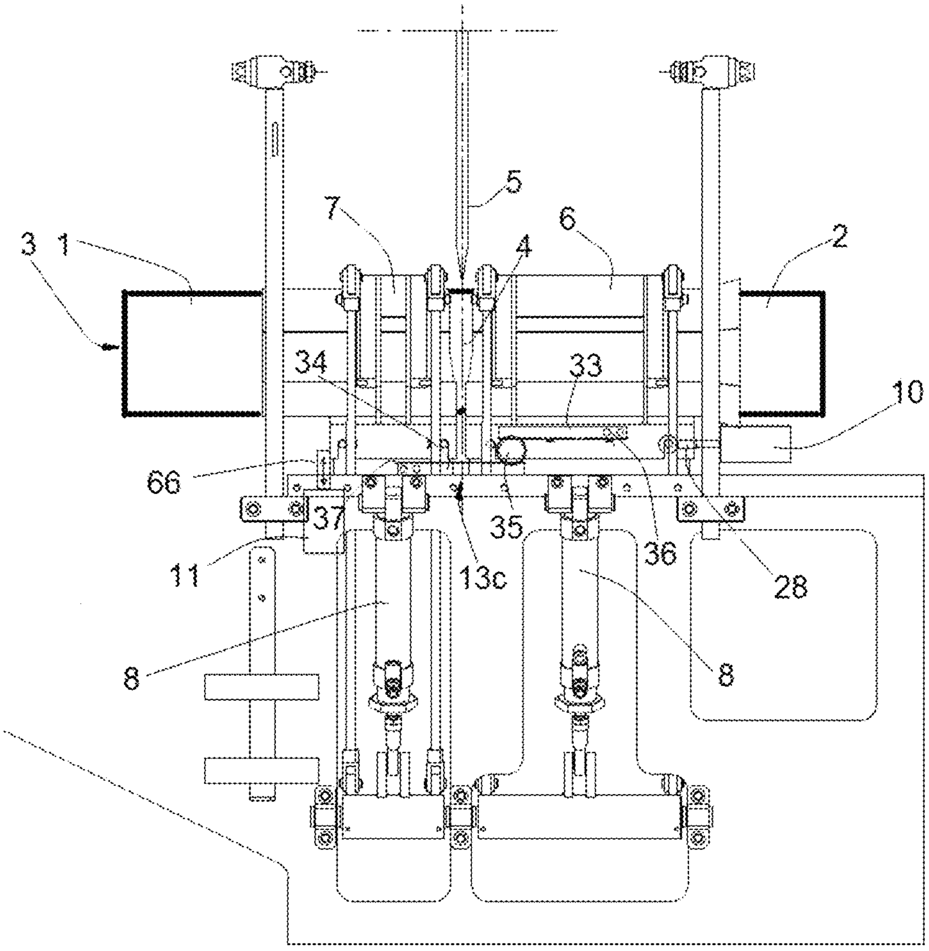
Figure 3:
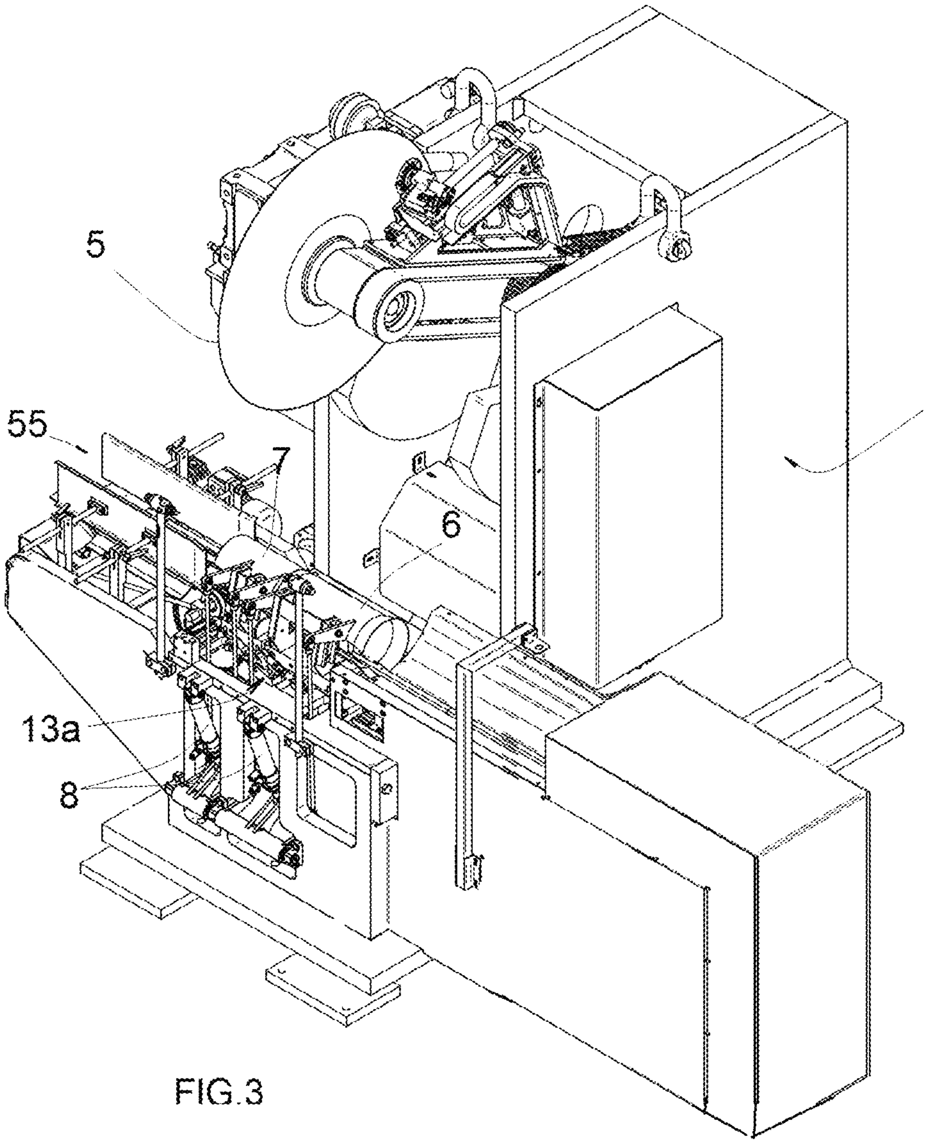

These and further advantages will be better understood by a person skilled in the art from the following description and the attached drawings, given as a non-limiting example, in which:

FIG. 1 shows a perspective view of a clamping device of the invention;

FIG. 1*a* shows a detail of the drive mechanism associated with the device of FIG. 1;

FIGS. 2*a*, 2*b*, 2*c* schematically show in side view alternative forms of the mechanism for actuating the device;

FIG. 3 shows a cutting machine equipped with the device of the invention.

DETAILED DESCRIPTION

With reference to the drawings, a device for locking the adjacent sections 1, 2 of a roll of paper 3 cut off by the cutting blade 5 of a cutting machine M is described, schematically represented in FIG. 3.

The cutting machine M is of the conventional type and comprises a frame 50 in which a motor (not shown) is housed for driving, for example by means of a belt transmission 53, an arm 51 carrying the rotating cutting blade 5, and provided preferably of a sharpening unit 52 and counterweights 56, also of a conventional type.

In operation, the blade 5 follows an orbital cutting path during which the cutting edge of the blade advances inside the roll 3 along a cutting section plane 4, with the adjacent sections 1, 2 of the roll 3 arranged in a feed channel 55 and each held in position by gripping members, called clamping devices, 6, 7 which are positioned along the channel 55 slightly spaced upstream and downstream of the cutting plane defined by the movement of the blade 5 so as to be able to let pass the blade during the operations.

With particular reference to the embodiment illustrated in FIG. 1, the clamping devices 6, 7 are also capable of assuming an unlocking configuration and a locking configuration of the respective section 1 or 2 of the roll 3, and to do this they are operated by an actuator 8 which is controlled during the cut operations to make the clamping devices pass from the unlocking configuration to the locking configuration and vice versa.

In the example described, both clamping devices 6, 7 comprise an open cylindrical sleeve 41 formed by two cylindrical portions 42, 43 reciprocally movable in a movement of contraction or expansion with respect to the roll 3 controlled by a respective hydraulic actuator 8 fixed at one end 57 to the frame 40 and at the other end 59 to an oscillating pedal 62 connected to a portion 43 of the cylindrical sleeve 41 movable by deformation by means of a tie rod 60 and a lever 61 fixed, for example by welding, to the deformable portion 43 and guided by a pin 63 sliding in a guide 64 which emerges and is integral with the frame 40.

Preferably, each clamping device is controlled by an actuator 8 connected to the clamping device by two levers 61 spaced along the length of the clamping device and operating as described above.

In operation, in order to pass from an open expanded unlocking configuration to a closed contracted locking configuration of the respective section 1, 2, the actuator 8, for example an hydraulic actuator, is commanded to push the pedal 62 which by means of the tie rod 60 causes the lowering of the lever 61 guided by the pin 63 and therefore the deformation of the cylindrical portion which surrounds and stably tightens the roll 3 arranged inside the clamping device.

According to the invention, the device is also provided with at least one second actuator 10 connected to the clamping devices 6, 7 to perform a reciprocal movement of the clamping devices in a locking configuration with respect to said cutting section plane 4, which are active immediately after the end of the cutting cycle of the roll 3, and of means 11 for inhibiting the moving away movement of the clamping devices which are instead active during the cutting advancement of the blade 5 through the roll 3.

Preferably, the inhibition means 11 comprise an actuator 11 which during the cutting advancement of the blade 5 maintains a locking pin 66 in an interfering position with the removal movement of the clamping devices 6, 7.

In the example described, the activation and control of the actuators 10 and 11 are carried out by means of a control and activation unit 12, schematized in FIG. 1, synchronized with the movement of the cutting blade and configured to inhibit the movement of the clamping devices during cutting of roll 3 and to activate the mutual separation immediately after the end of the cut.

In the functioning of the device, during the cutting phase the unit 12 keeps the clamping devices in the locking position of the sections 1, 2 and the locking pin 66 of the actuator 11 in an advanced interference position so as to inhibit any lateral movement of the clamping devices.

At the end of the cut, the unit 12 keeps the clamping devices locked on the sections, releases the pin 66 which returns from the interference position, and activates the actuators 10 to perform the lateral removal of the sections 1, 2 from the blade 5.

Subsequently, the sections can be freed by expanding the clamping devices, the roll 3 is made to advance along the channel 55 for the execution of a further cutting cycle.

Alternatively, it is possible to provide that the means for inhibiting the lateral movement of the clamping devices during cutting are constituted by the same actuators 10, if sized sufficiently to be able to oppose the lateral thrust exerted by the blade 5 on the sections 1, 2 during cutting and controlled by the unit 12 so as to remain stationary during the cutting phase.

Advantageously, with this solution the precision of the cut is guaranteed by preventing the movement of the sections during the advancement of the blade 5 through the roll and at the same time excessive overheating of the blade is avoided by detaching the sections 1, 2 from the blade as soon as the cut is concluded.

In the example illustrated in FIGS. 1, 1*a* and 2*a*, the reciprocal movement of the clamping devices 6, 7 is performed thanks to two linear actuators 10 each connected by means of a rod 28 to one of the two clamping devices, to impose a movement away from the blade. 5 and by a reciprocal constraint kinematic mechanism 13*a* which determines a symmetrical movement away from the clamping devices 6, 7 with respect to the cutting area, the clamping devices 6, 7 being able to slide on one or more rectilinear guides 38, 39 mounted on the fixed frame 40.

Alternatively, it will be possible to provide actuators 10 connected to both clamping devices and controlled by the unit 12 so as to carry out the movement away at the end of the cut.

In greater detail, the symmetrical constraint kinematics may comprises a rocker mechanism 13*a* provided with a lever 14 with a fixed central fulcrum 15 and two opposite ends 16 fixed to first ends 18 of respective first and second rods 20, 21 in turn each fixed with second ends 22, 23 to a respective clamping device 6, 7. With this solution, when at the end of the cut the actuators 10 impose the moving away of the first clamping device 6, this movement causes a rotation of the lever 14 and a symmetrical removal of the second clamping device 7 connected to the second rod 21.

With reference to the exemplary embodiment schematized in FIG. 2*b*, the kinematic mechanism with symmetrical constraint comprises a kinematic mechanism 13*b* with belt transmission 25 subtended between two pulleys 26, 27 in which the branches of the belt are each connected to one of said clamping devices 6, 7 by respective fixing means 29, 30, in such a way that when the actuator 10 commands the removal of the first clamping device 6 from the cutting area and the displacement of the respective branch of the belt, due to the rotation of the pulleys the opposite branch connected to the second clamping device 7 determines a symmetrical displacement thereof.

Similarly, with reference this time to the embodiment schematized in FIG. 2*c*, the kinematic mechanism with symmetrical constraint comprises a kinematic mechanism 13*c* with two racks 33, 34 engaged on the diametrically opposite sides of an intermediate toothed wheel 35 and each connected to one of the pressers 6, 7 by means of respective fixing means 36, 37.

With this solution, when the actuator 10 commands the first clamping device 6 to move away from the cutting area and the displacement of the respective rack 33 due to the rotation of the intermediate toothed wheel 35, the opposite rack 34 connected to the second clamping device 7 determines its symmetrical displacement.

The present invention has been described according to preferred embodiments but equivalent variants can be conceived without departing from the scope of the invention.

The invention claimed is:

1. Device for locking two adjacent sections of a paper roll placed on the sides of a cutting section plane defined by the cutting advancement movement through the roll of a cutting blade of a cutting machine, wherein the device comprises a pair of clamping devices, each configured to be able to assume an unlocking configuration and a locking configuration of a respective adjacent sections of the roll, at least a first actuator operable on command to pass said clamping devices from the unlocking configuration to the locking configuration of the respective adjacent sections, and vice versa, at least a second actuator connected to the clamping devices and configured to perform a distancing movement of the clamping devices in locking configuration with respect to said cutting section plane, wherein it comprises inhibition means of the mutual distancing movement of the active clamping devices during the cutting advancement of the blade through the roll, and, control and activation means operatively connected to said inhibition means and to said second actuator of the clamping devices, configured to deactivate said inhibition means and activate said second actuator to perform the mutual distancing of the clamping devices at the end of a complete cutting step of the roll performed by the blade.

2. Device according to claim 1, wherein said second actuator is connected to a first clamping device to impose a distancing movement from the cutting section plane of the first clamping device and in that it comprises a kinematic mechanism for mutually constraining the clamping devices, configured to cause a symmetrical distancing movement of both clamping devices with respect to the cutting section plane.

3. Device according to claim 2, wherein said kinematic symmetrical constraint mechanism comprises a rocker mechanism provided with a lever with a fixed central fulcrum and two opposite ends fixed to first ends of respective first and second rods in turn each fixed with second ends to a respective clamping device of said clamping devices, said second actuator being connected to the first clamping device to force a distancing movement from the cutting section plane of the first clamping device and thus a rotation of the lever and a symmetrical distancing of the second clamping device connected to the second rod.

4. Device according to claim 2, wherein said kinematic symmetrical constraint mechanism comprises a belt transmission underneath between two pulleys, said second actuator being connected through a connecting element to the first clamping device to impose a distancing movement from the cutting section plane of the first clamping device, to cause the displacement in opposite directions of respective branches of the belt, each connected to one of said clamping devices by respective fixing means.

5. Device according to claim 2, wherein said kinematic symmetrical constraint mechanism comprises a double rack transmission provided with two racks engaged on diametrically opposite sides of an intermediate gearwheel, said second actuator being connected by a connecting element to a first clamping device to impose a distancing movement from the cutting section plane of the first clamping device and cause the displacement in opposite directions of the two racks, each connected to one of said clamping devices by respective fixing means.

6. Device according to claim 1, wherein said inhibition means of the mutual distancing movement of the clamping devices comprise an actuator controlled by a control and activation unit which during the cutting advancement of the blade through the roll maintains a locking pin in an interfering position with the distancing movement of at least one of said clamping devices.

7. Device according to claim 1, wherein said clamping devices comprise an open cylindrical sleeve formed by at least two cylindrical portions mutually movable in a contraction or expansion movement, controlled by said at least one first actuator to switch from an open expanded unlocking configuration to a closed contracted locking configuration of the respective sections.

8. Device according to claim 7, wherein said clamping devices comprise at least one fixed cylindrical portion and at least one cylindrical portion movable by elastic deformation actuated by said at least one first actuator.

9. Cutting machine comprising a locking device according to claim 1.

10. Method for cutting paper rolls into two adjacent sections, comprising the following steps locking both of said adjacent sections of the paper roll placed on the sides of a cutting section plane, performing a complete transverse cut of the roll by means of a cutting blade advancing through the roll, inhibiting the distancing movement of the sections during said cutting step;

distancing both sections away from the cutting section plane immediately after the completion of said cutting step of the roll performed by the blade.

* * * * *